US012809715B2

(12) United States Patent
Dasari et al.

(10) Patent No.: US 12,809,715 B2
(45) Date of Patent: Nov. 24, 2026

(54) ARTIFICIAL INTELLIGENCE BASED APPLICATION ERROR DETECTION AND RESOLUTION

(71) Applicant: NetApp, Inc., San Jose, CA (US)

(72) Inventors: Ravi Sankar Dasari, Karnataka (IN); Sukanya Ravi, Bangalore (IN); Rohit Ghai, Punjab (IN)

(73) Assignee: NetApp, Inc., San Jose, CA (US)

( * ) Notice: Subject to any disclaimer, the term of this patent is extended or adjusted under 35 U.S.C. 154(b) by 138 days.

(21) Appl. No.: 18/770,725

(22) Filed: Jul. 12, 2024

(65) Prior Publication Data

US 2026/0017137 A1 Jan. 15, 2026

(51) Int. Cl.
*G06F 11/07* (2006.01)

(52) U.S. Cl.
CPC ...... *G06F 11/0793* (2013.01); *G06F 11/0787* (2013.01); *G06F 11/079* (2013.01)

(58) Field of Classification Search
CPC . G06F 11/0793; G06F 11/0787; G06F 11/079
See application file for complete search history.

(56) References Cited

U.S. PATENT DOCUMENTS 7,487,181 B2 * 2/2009 Lakshminarayanan ...................... G06Q 10/10 707/999.102
7,490,073 B1 * 2/2009 Qureshi ................. G06N 5/048 706/56
10,649,826 B2 5/2020 Chheda et al.
10,917,324 B2 2/2021 Richards et al.
11,057,266 B2 7/2021 Jain et al.
11,093,229 B2 8/2021 Tiwari et al.
11,137,752 B2 10/2021 Cella et al.
11,175,982 B2 11/2021 Gokhale et al.
11,194,635 B2 12/2021 Carlen et al.
11,271,796 B2 3/2022 Tapia et al.
11,314,574 B2 4/2022 Handa et al.
(Continued)

OTHER PUBLICATIONS

Doglio ("What is Human in the Loop Automation," Process Orchestration, Camunda, Jun. 4, 2024) (Year: 2024).*
(Continued)

*Primary Examiner* — Ashish Thomas
*Assistant Examiner* — Kayo Lisa Rusin
(74) *Attorney, Agent, or Firm* — Cooper Legal Group, LLC

(57) ABSTRACT

Techniques are provided for artificial intelligence (AI) based application error detection and resolution. Extensive amounts of time and resources are consumed by service providers when attempting to resolve application errors experienced by customers. Unfortunately, a service provider may spend tedious amounts of manual effort to evaluate and solve an error that is already known or already solved. The techniques provided herein reduce the amount of time and resources involved in detecting and resolving errors associated with applications. In particular, an error mapping is generated for a current troubleshooting case to resolve for an application. The error mapping is compared to error mappings of previously resolved troubleshooting cases. If a match is found, then a troubleshooting action associated with a previously resolved troubleshooting case is suggested or executed. Otherwise, a service ticket is created for solving the current troubleshooting cases.

27 Claims, 12 Drawing Sheets

(56) References Cited

U.S. PATENT DOCUMENTS

| | | | |
|---|---|---|---|
| 11,481,159 B2 | 10/2022 | Payton | |
| 11,595,288 B2 | 2/2023 | Nguyen et al. | |
| 11,863,409 B2 | 1/2024 | Balaiah et al. | |
| 11,894,993 B2 | 2/2024 | Sinha et al. | |
| 11,954,112 B2 | 4/2024 | Siebel et al. | |
| 12,095,628 B2 | 9/2024 | Lukens et al. | |
| 2022/0148008 A1 | 5/2022 | Pham et al. | |
| 2023/0259821 A1* | 8/2023 | Travalini | G06N 3/0455 706/12 |
| 2024/0176646 A1 | 5/2024 | Bailey et al. | |
| 2024/0330090 A1* | 10/2024 | Mandal | G06F 11/0769 |
| 2025/0315337 A1* | 10/2025 | Dande | H04L 9/50 |

OTHER PUBLICATIONS

Akula et al ("Redact sensitive data from your logs on-prem by using Observability Pipelines," Data Dog, Apr. 18, 2024), https://web.archive.org/web/20240529232848/https://www.datadoghq.com/blog/observability-pipelines-sensitive-data-redaction/ (Year: 2024).*

"Data deduplication," Wikipedia article, updated on Mar. 13, 2024 (Year: 2024).*

Iguazio ("What is the Classification Threshold in Machine Learning?" Iguazio, captured by Wayback Machine on Apr. 15, 2024), https://web.archive.org/web/20240415092651/https://www.iguazio.com/glossary/classification-threshold/ (Year: 2024).*

Jesse, Martin, "What is a support ticket?" Zendesk, Jun. 6, 2024 (Year: 2024).*

"Python set intersection() method," w3 schools, Sep. 5, 2018 (Year: 2018).*

"Longest Common Subsequence," Enjoy Algorithms, Aug. 26, 2021 (Year: 2021).*

"Tf-idf," Wikipedia, Mar. 15, 2024 (Year: 2024).*

* cited by examiner

700

ALL -> TRACE -> DEBUG -> INFO -> WARN -> ERROR -> FATAL

710

*2021-10-31 13:11:12,813 ERROR [io.undertow.request] (default task-120483) UT005023: Exception handling request to /acq/ontap/ems: java.lang.IllegalStateException: UT000135: renegotiation failed*

720

*Exception handling request to /acq/ontap/ems: java.lang.IllegalStateException: renegotiation failed*

730

- *there was a problem posting the autosupport message (265)*
- *cached polltimingdata entry was removed during change processing for (383)*
- *c.o.s.a.f.m.communicationmanager server returned http status (334)*

*Mappings: [265, 383, 334]*

FIG. 7A

740

```
0. specified alias: cluster_name_or_ does not exists in the truststore
1. line inventory change listener error
2. com.onaro.sanscreen.acquisition.sessions.acquisitionunitexception
3. fail stop report from originator:
4. c.n.o.n.e.emsrapimanager  failed to call system-get-version java.io.ioexception: the host  not be resolved
5. unified manager database backup fails with error: copying a file or directory is failed due to a file system error
6. exception handling request to  org.springframework.security.web.firewall.requestrejectedexception: the request was rejected because
the http method "qualys" was not included within the list of allowed http methods
7. inventory change listener error java.lang.runtimeexception: com.ctc.wstx.exc.wstxunexpectedcharexception: unexpected character
expected '='
8. aiqum cluster addition in cli with domain user fails with error the username or password you entered is incorrect"
9. when attempting to add a cluster in unified manager an error appears stating:
10. cluster collections begin to fail abruptly with error, "keystore was tampered with, or password was incorrect"
```

FIG. 7B

760

Test case:
'2009802986': [[1613, 1133, 1134, 48, 105, 961]]

Matches:
'2009813506': (3, [1133, 1134, 961])
'2009781760': (3, [1613,1133, 1134])
'2009654688': (3, [1133, 1134, 961]

770

Test case:
'2009802986': [[1613, 1133, 1134, 48, 105, 961]]

Matches:
'2009781760': (3, [1613,1133, 1134])
'2009654688': (2, [1133, 1134]
'2009813506': (2, [1133, 1134])

780

Test case:
'2009802986': [1613, 1133, 1134, 48, 105, 961]

Matches:
'2009813506': (3, [('1133', 5.30), ('1134', 5.51), ('961', 4.69)]) - 0.36
'2009781760': (3, [('1613', 6.14), ('1133', 5.30), ('1134', 5.51)]) – 0.33
'2009654688': (3, [('1133', 5.30), ('1134', 5.51), ('961', 4.69)]) - 0.30

FIG. 7C

800

```
"results": {
  "Suggested Cases": [
    {
      "2009568134",
      "http://dexter-rtp-app.corp.netapp.com:8080/etscase?caseid=2009920854&id=2009568134"
    },
    {
      "2009711584",
      "http://dexter-rtp-app.corp.netapp.com:8080/etscase?caseid=2009920854&id=2009711584"
    },
    {
      "2009609081",
      "http://dexter-rtp-app.corp.netapp.com:8080/etscase?caseid=2009920854&id=2009609081"
    }
  ],
  "Suggested Knowledge View Links": [
      {
        "Does the support team provide assistance with custom SQL Unified Manager reports?",
        "http://dexter-rtp-app.corp.netapp.com:8080/etskb?caseid=2009920854&guid=a7e0b85909cd4817a248c114de448977"
      },
      {
        "How to stop alerts related to Obsolete/Resolved events in Unified Manager",
        "http://dexter-rtp-app.corp.netapp.com:8080/etskb?caseid=2009920854&guid=2e5aac1412e94e93a238cb4a3afd0e3d"
      },
      {
        "Unified Manager cluster removal stuck with the description \"Deletion in progress\"",
        "http://dexter-rtp-app.corp.netapp.com:8080/etskb?caseid=2009920854&guid=b0a465df106b4a0ca74e01676a5e2504"
      }
  ],
```

FIG. 8

ARTIFICIAL INTELLIGENCE BASED APPLICATION ERROR DETECTION AND RESOLUTION

TECHNICAL FIELD

Various embodiments of the present technology relate to resolving application errors.

BACKGROUND

Most application providers that develop and maintain applications provide troubleshooting and other support for the applications. The applications may be deployed on-premises on devices maintained by a customer, or may be hosted within a cloud computing environment such as where an application is hosted as Software as a Service. In order for an application provider to support and troubleshoot an application, the application stores operational information into logs that can be reviewed during troubleshooting. The logs may contain error messages, code stack data, and/or other information that can be used as telemetry data for troubleshooting errors associated with the application.

When a customer reports an issue associated with the application, a service ticket may be generated to track a lifecycle of troubleshooting and resolving the issue. The service ticket may be processed through various levels of support teams until the issue is resolved. A first level support team may collect and review available data from logs to ensure that the required data for troubleshooting is available. A second level support team may perform basic troubleshooting to narrow down the problem. If the second level support team is able to identify a potential solution, then the second level support team can provide or implement the potential solution for the customer (e.g., change a configuration setting, apply an existing patch or update to the application, etc.). If the second level support team cannot resolve the issue using the basic troubleshooting, then the service ticket is escalated to a third level support team that performs more in-depth troubleshooting. The lifecycle of troubleshooting and resolving the issue can involve any number of support teams and/or engineering teams, which is time consuming, costly, expends a significant amount of manual effort that can be duplicative if the issue is an already resolved issue with an existing solution. Reducing the time and resources used to resolve an issue will decrease the downtime of the application affected by the issue (e.g., a customer may be unable to backup data using a backup and restore application until the issue is resolved).

DESCRIPTION OF THE DRAWINGS

Embodiments of the present technology will be described and explained through the use of the accompanying drawings in which:

FIGS. 7A-7C are examples of data structures used as part of AI based application error detection and resolution in accordance with an embodiment of the present technology.

FIG. 8 is an example of a troubleshooting instructions provided as part of AI based application error detection and resolution in accordance with an embodiment of the present technology.

Figure 1:
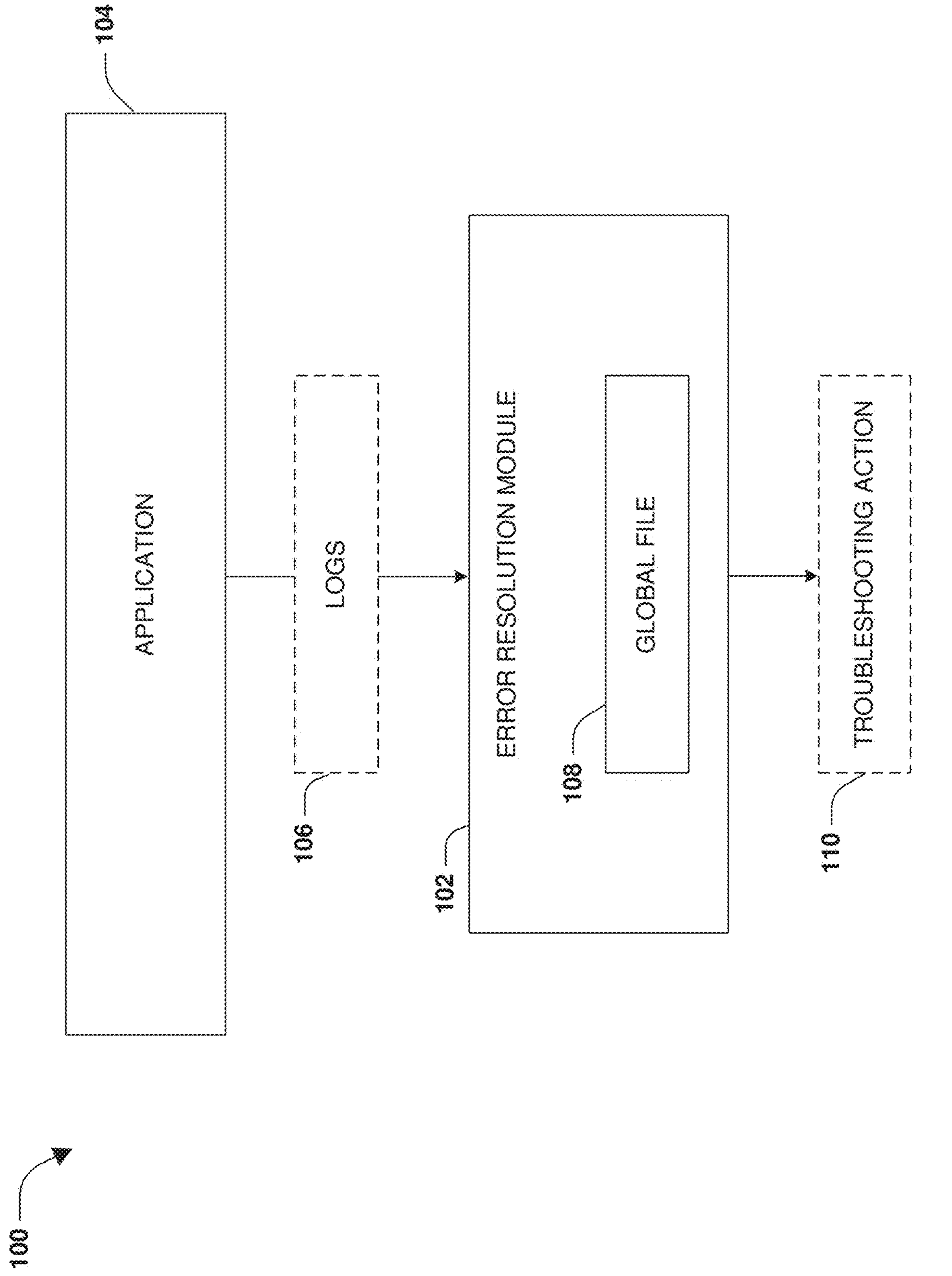
FIG. 1 is a block diagram illustrating an embodiment of a system for artificial intelligence (AI) based application error detection and resolution in accordance with an embodiment of the present technology.

The drawings have not necessarily been drawn to scale. Similarly, some components and/or operations may be separated into different blocks or combined into a single block for the purposes of discussion of some embodiments of the present technology. Moreover, while the present technology is amenable to various modifications and alternative forms, specific embodiments have been shown by way of example in the drawings and are described in detail below. The intention, however, is not to limit the present technology to the particular embodiments described. On the contrary, the present technology is intended to cover all modifications, equivalents, and alternatives falling within the scope of the present technology as defined by the appended claims.

DETAILED DESCRIPTION

Various embodiments of the present technology relate to artificial intelligence (AI) based application error detection and resolution. Customer experience is a high priority for application providers that develop and maintain applications used by customers. Many applications provide critical functionality for users such as the ability to backup and restore data, replicate data between data centers, and provide high availability access to data. If an application experiences an error, then the application may be unable to provide functionality required by the users such as where a user is unable to backup data until the error is resolved. Accordingly, an application provider needs the ability to quickly and efficiently resolve errors in order to reduce application downtime and improve customer experience and satisfy key performance indicators (KPIs) such as Time to Resolution (TTR).

Conventional application error troubleshooting and resolution techniques involves a significant amount of time and manual effort. When an error of an application is reported, a service ticket is created for troubleshooting and resolving the error. In a typical life cycle of a service ticket, the service ticket passes through multiple stages with different support teams processing the service ticket such as by performing data collection, basic troubleshooting, advanced troubleshooting, and/or escalation to engineering. The processing of the service ticket includes the collection and analysis of data stored in logs associated with the application. The logs may include error messages, a code stack, and other information that can be used for troubleshooting. The stages of log analysis involve time and manual effort, which increases the time to troubleshoot and resolve the error. During a first stage of log analysis, data associated with operation of the application is collected and reviewed to determine whether the necessary logs are available for troubleshooting. During a second stage of log analysis, basic troubleshooting is performed. If a potential solution is identified, then the potential solution may be attempted to resolve the error. If the error cannot be resolved, then a third stage of log analysis is performed where multiple rounds of log collection and analysis may be implemented for in-depth troubleshooting. Other stages may also be performed such as escalation to an engineering team that may also perform log collection and analysis. Conventional log analysis generally includes the manual extraction of logs from a bundle, identifying the relevant logs to be analyzed, manually identifying and extracting key messages from the logs, determining a probable cause of an error based upon observed error patterns in the logs, and providing a solution to address the problem.

Conventional log analysis and troubleshoot is time consuming and involves extensive manual effort. Often, there is a duplicative effort in solving a problem for which there is a known solution. However, conventional application error troubleshooting and resolution techniques are often unable to determine that a current problem already has a solution (e.g., 50% of service tickets may be associated with a previously resolved issue having an existing solution that cannot be adequately identified as corresponding to the service tickets). A substantial amount of manual effort is involved because logs can vary between applications, and there is no automated solution for identifying which logs are relevant, identifying error patterns in the logs, stitching the error patterns together for identifying a probable cause of an error, etc. Identifying and evaluating the right logs, along with building and understanding error patterns is a very time consuming tasks, especially when each log could be gigabytes in size.

Conventional troubleshooting techniques may also rely upon manually written signatures for matching a current error with previously resolved errors that have known solutions (e.g., word by word matching of a current error with previously resolved errors). Manually writing signatures for error messages is a time consuming and extensive task as signatures need to uniquely identify a problem, and must be sustained over a period of time such as within a database, which is inefficient and prone to reduced match detection over time as the number of signatures grow into the thousands of signatures. Additionally, manual signatures are problematic where the signatures are written too strictly such that a minor code change could make a signature invalid. Furthermore, duplicate signatures could exist, small deviations in error messages can result in additional signatures that must be maintained, and other problems can arise. Thus, conventional techniques for manually creating signatures for error messages involve significant amounts of manual effort and are not scalable.

The disclosed techniques overcome these disadvantages of conventional application error troubleshooting techniques by leveraging artificial intelligence and machine learning in a non-conventional and non-routine manner in order to construct a scalable system for quickly and automatically identifying known issues and available solutions to the known issues, which is further described in relation to FIGS. 1-8. In particular, the disclosed techniques provide an automated process for extracting information related to an error associated with an application, generating an error mapping unique to error messages identified from the extracted information, matching the error mapping with error mappings of previously resolved troubleshoot cases, and providing solutions or automatically executing solutions if there are known solutions to the error.

FIG. 1 is a block diagram illustrating an embodiment of a system 100 for AI based application error detection and resolution. The system 100 may include an error resolution module 102 used to troubleshoot errors associated with an application 104 by extracting error related information from logs 106 associated with the application 104. The error resolution module 102 creates an error mapping based upon error messages identified from the error related information, and compares the error mapping to error mappings of historic troubleshooting cases. If there is a match, then the error resolution module 102 suggests or automatically executes a troubleshooting action 110 associated with a matching historic troubleshooting case.

The error resolution module 102 automates log analysis and the identification of know problems and/or solutions in order to reduce the time, effort, and resources consumed through conventional application error troubleshooting and resolution techniques that manually analyze and troubleshoot errors related to applications.

The error resolution module 102 is configured to identify a closest solution to an error associated with the application 104 by analyzing error related information (telemetry data) in an automated manner using AI/ML, which enables lower levels of support to have more knowledge for resolving customer issues and reduces escalation of service tickets to high levels of support. The error resolution module 102 can perform auto-healing of known defects by automatically executing troubleshooting actions (e.g., modifying a configuration setting for an application, applying a software update or patch to the application, etc.). In this way, the error resolution module 102 is capable of: 1) making applications more resilient to faults, 2) reducing manual effort, time, resources, and cost for identifying known issues, 3) performing troubleshooting in a product agnostic manner applicable to any product(s), 4) supporting improved detection of new errors and error patterns, 5) differentiating between meaningful errors and noise within logs, 6) identifying and deduplicating redundant knowledge base articles, and 7) troubleshooting errors where access to logs may be restricted by redacting sensitive data.

The error resolution module 102 implements a unique approach to creating signatures (error mappings) for historic troubleshooting cases. In particular, the error resolution module 102 implements a training phase for a model that is trained to match an error mapping of an error being troubleshot with error mappings of historical troubleshooting cases. The training phase includes a log extraction and processing stage. Individual logs are extracted from a bundle. Error related information (e.g., key information such as errors and critical information) are extracted from the individual logs. Basic pre-processing is performed upon the error related information such as removing timestamps and customer specific information (e.g., an IP address, a host name, etc.). Advanced pre-processing is performed upon the error related information such as by using natural language processing and/or word embeddings to remove duplicate error messages. The training phase includes a global file creation stage that creates the global file 108 based upon error messages extracted from logs of past service tickets, notes sections of the past service tickets, and knowledge base articles. The global file 108 of error messages is indexed for searching. The training phase includes an error mapping (error signature) creation phase for the past service tickets. An error mapping (error signature) is created using the global file 108 of error messages for each service ticket, knowledge base article, and bugs.

The error resolution module 102 implements an error processing phase using the model to identify a closest solution that can be applied to resolve an error experienced by an application. The error processing phase includes the log extraction and processing stage. Individual logs are extracted from a bundle associated with the application. Error related information (e.g., key information such as errors and critical information) are extracted from the individual logs. Basic pre-processing is performed upon the error related information such as removing timestamps and customer specific information (e.g., an IP address, a host name, etc.). Advanced pre-processing is performed upon the error related information such as using natural language processing and/or word embeddings to remove duplicate error messages. The error processing phase includes the error mapping (error signature) creation phase for error messages extracted from the error related information. The error resolution module 102 utilizes the model and/or natural language processing techniques to match the error mapping with existing error mappings of historic troubleshooting cases. The error resolution module 102 is generic and application agnostic, is capable of seamlessly auto triaging and resolving known issues, and is capable of generating new error mappings (new error signatures) for new errors not yet accounted for in the global file 108 (e.g., a new error which was never encountered in the past) as part of a self-learning process.

In some embodiments, the error resolution module 102 is implemented through an automated approach to suggest a closest known solution for a new application error that is logged with support for troubleshooting. The automated approach includes the extraction of logs from a bundle, extraction of error related information, basic and advance pre-processing, the generation of error mappings (error signatures), and matching the error mappings with existing error mappings in order to identify a closest known issue and propose a corresponding solution.

In some embodiments, the error resolution module 102 is implemented through an automated approach to suggest a closest known solution in response to receiving telemetry data from a customer or user of an application such as where the application is hosted as a SaaS application and/or an auto support feature is enabled. The automated approach include the extraction of logs from a bundle, extraction of error related information, basic and advance pre-processing, the generation of error mappings (error signatures), and matching the error mappings with existing error mappings in order to propose a closest known issue and corresponding solution.

In some embodiments, the error resolution module 102 provides on-demand suggestions of known problems and corresponding solutions such as for situations where support personnel understands the errors that are at issue, but is not sure how to address the errors. Accordingly, the errors may be input into the error resolution module 102 (e.g., input by the support personnel that identified the errors) that will on-demand output a closest matching known problem and corresponding solution. In this way, the error resolution module 102 may implement various services that may be individually and independently invokes as stand-alone services, which will be described in further detail in relation to FIG. 6. The services may be used to identify patterns such as noisy error messages and supportability gaps that can be identified at an individual application level for improvement.

The error resolution module 102 may implement AI based error signature to solution (EST) for identifying a closest solution to a customer problem (if the current error is a known issue) by automatically analyzing telemetry data (error related information). The error resolution module 102 may perform log analysis by retrieving telemetry data from various available resources. The log analysis may be performed upon textual telemetry and logs, which may be obtained from an on-premises computing environment, application details, and/or workflow specific details. The error resolution module 102 collects logs based upon the type of application being troubleshot, which can include automated log collection, manual on-demand collection, or auto streamed logs. Some applications may support or include a log generation and upload infrastructure where logs can be automatically pushed periodically or on-demand to a support center or other log repository accessible to the error resolution module 102. If an application does not have a log generation and upload infrastructure, then the logs may be manually retrieved such as from the on-premises computing environment. If the application is hosted as a SaaS application where the application/services are internally managed by the application provider, then the logs are directly available through telemetry applications/services such as elastic search. A log bundle may be archived such as in a compressed format, and thus certain logs may be identified and selectively extracted.

The error resolution module 102 extracts error related information such as errors, critical information, and/or other key information from the logs. In particular, relevant logs may be identified (e.g., an error log, an application update log, a command execution log, a network connectivity log, and/or other logs may be relevant for identifying and troubleshooting errors of an application), and critical messages or error messages may be extracted from the relevant logs. Based upon the logging framework used by an application, logs generated from various workflows may be dumped with appropriate logging level. For example, a logging framework may utilize the following logging levels in increasing order of severity ALL->TRACE->DEBUG->INFO->WARN->ERROR->FATAL. Generally, the critical and failure scenarios use the logging level WARN and above. Therefore, pulling the logs having this logging level threshold and above will give a picture of crucial events/failures seen in the application. Appropriate regular expressions must be customized for each application, based on the logging mechanism used, to retrieve the relevant error messages from the logs. In this way, the error resolution module 102 selects a particular logging level in order to identify relevant error messages. Thus, the messages having that logging level and above will be pulled out from the bundle for evaluation. For instance, if the chosen logging level is WARN—all the WARN, ERROR and FATAL error messages are picked from the logs, as illustrated by data structure 700 of FIG. 7A. Also, there is a provision to define any specific patterns or expressions, thereby all the error messages having the defined pattern or satisfy an expression will be selected. All the filtered messages are written to a new file, which will be used for further processing and analysis. This filtered file can give a support engineer a quick overview of various critical events that have happened in the computing environment hosting the application.

The error resolution module 102 performs basic pre-processing of the filtered file storing the error related information. In some embodiments, a log may include: 2021-10-31 13:11:12,813 ERROR [io.undertow.request] (default task-120483) UT005023: Exception handling request to/acq/ontap/ems: java.lang.IllegalStateException: UT000135: renegotiation failed, as illustrated by data structure 710 of FIG. 7A. This log contains the following elements: a timestamp of the error message, a thread ID, a source class, and the error message.

The logging style can change from application to application, and the amount of information captured also varies. Since the error explainability lies with the error message component of the logs, merely this error message component (section) is extracted for further analysis and the rest is ignored, in some embodiments. In some embodiments, other information may also be extracted such as timestamps.

As the logging style is not consistent with all the logs and across applications, preprocessing techniques for extracting the error message from the log may be customized such as through user input. A tool is provided to give the flexibility to define multiple preprocessing techniques that can be called. Code reusability can be performed if any preprocessing technique is already developed. For example, the following preprocessing techniques are used in the below specified order. The final refined message after performing the preprocessing is given as follows: Exception handling request to/acq/ontap/ems: java.lang.IllegalStateException: renegotiation failed, as illustrated by data structure 720 of FIG. 7A. In this way, various preprocessing techniques can be defined in a specified order to refine the error message from the logs.

The error resolution module 102 performs advanced pre-processing using natural language processing and/or word embeddings to remove duplicate error messages. One common scenario that is encountered during any process or workflow failure is that the error repeats multiple times. With something is not going as intended, all the subsequent attempts will end up with the same set of errors, and the logs are filled with the same/similar errors. Since it is useful to understand the problem from the error messages and/or the number of times an errored occurred, there is a need to count or deduplicate the messages observed in the logs. The disclosed technique can intelligently group all relevant error messages as duplicates of one another so that a count of each error message occurrence may be maintained.

After performing the basic pre-processing, all the messages are converted into a numerical form using a TF-IDF vectorizer, according to some embodiments. Then, the errors messages are compared against each other, and similarity scores are calculated among them. The error messages having a similarity score exceeding a similarity threshold are considered as duplicates. This example shows how 2 error messages related to the same problem with varying words are grouped as duplicates, where error message 1 is: c.o.s.a.d.n.b.z.c.n.QosWorkloadBuilder ONTAP Workload Mapping BUG Hit: Workload Name=cera_ocp_preprod-wid1280, Workload Volume=fg_oss_1692181529, and where error message 2 is: c.o.s.a.d.n.b.z.c.n.QosWorkload-Builder ONTAP Workload Mapping BUG Hit: Workload Name=cera_ocp_prod-wid53893, Workload Volume=fg_oss_1692181529. The similarity score between the vectors of these 2 error messages is relatively high (due to a greater number of common words), and are thus determined to be duplicates. The output of the advanced pre-processing is a unique set of refined messages precisely talking about the errors in the logs.

The error resolution module 102 creates the global file 108 once the error messages are pre-processed such as deduplicated for each troubleshooting case relating to a log, case notes, and knowledge base information related to an error of the application. The global file 108 is created to include a comprehensive list of unique error messages that have been pre-processed, deduplicated, and are specific to a particular application (e.g., a global file per application or product).

To create the global file 108, each preprocessed document is individually reiterated through by the error resolution module 102. To initialize the global file 108, the first encountered error message is kept without additional processing. For subsequent error messages from the preprocessed document, the error messages are compared with all the error messages already present in the global file 108 using word embeddings and similarity techniques. By employing word embeddings and a similarity threshold, an incoming error message can be evaluated to determine if the incoming error message is similar to any existing error message in the global file 108. If a similarity exceeding the similarity threshold is found, then this is an indication that a similar copy of the incoming error message already exists in the global file 108. Consequently, the incoming error message is not added. To optimize this process, the error resolution module 102 identifies such cases and excludes the error messages without additional comparisons in order to conserve processing resources used to build the global file 108. Conversely, if the incoming error message does not exceed the similarity threshold when compared to all existing error messages in the global file 108, then the incoming error message is included in the global file 108.

The comparisons performed by the error resolution module 102 for building the global file 108 rely on word embeddings/vectors, with the flexibility to choose from unit vectors, DF vectors (document frequency: the number of documents containing a specific term), IDF vectors (inverse document frequency-based vectors), and TF-IDF vectors. The vocabulary is constructed using the pre-processed error messages, allowing for custom regex tokenization. Additionally, either Cosine or Jaccard may be selected as the similarity technique.

The creation of the global file 108 occurs during the training phase. Once created, the word vectors for each error message of the global file 108 are preserved in a database. FIG. 7B illustrates an embodiment 740 of the global file 108. Also, a text file consisting of error messages is created. Furthermore, the vocabulary and word scores may be saved such as in a pickle file.

The error resolution module 102 creates error mappings (error signatures) for errors (e.g., existing service tickets such as for historic errors). The error resolution module 102 performs a mapping or assignment of a unique index (e.g., as part of an error mapping) for each pre-processed error message associated with an error of the application using the global file 108. Each error message within the global file 108 may be assigned an index value (e.g., "application crash XYZ" error message is mapped to index value "158").

To create the error mappings, a vector-based similarity score is calculated for each pre-processed error message (error messages extracted from a log associated with the application experiencing the error to troubleshoot) in comparison to every error message present in the global file 108. An error message with the highest similarity score is selected from the global file 108 as the best match, and the index of the global file 108 is assigned to the corresponding pre-processed error message. If a particular message is not found or fails to meet the similarity score threshold, a value of '−1' (or any other value) is assigned to that error message. This indicates that a new error message is encountered, which was never seen during the training of past data.

As there can be multiple error messages in the processed log, this process converts a list of error vectors into a list of indexes corresponding to the global file 108. In this process, the vocabulary and scores that are stored in a pickle file are utilized, which were generated during the creation of the global file 108. Additionally, vectors for each error message in the global file 108 have been stored for reference. For example, the following error messages from the logs are mapped to the below indexed from the global list: 1) there was a problem posting the autosupport message (265), 2) cached polltimingdata entry was removed during change processing for (383), and 3) c.o.s.a.f.m.communicationmanager server returned http status (334), which results in error mappings: [265, 383, 334], as illustrated by data structure 730 of FIG. 7A. The mapped indexes are referred to as an error signature or error mapping.

The error resolution module 102 provides results for errors (e.g., suggestions of troubleshooting actions to perform for a service ticket, automatic execution of a troubleshooting action, etc.). As previously discussed, error mappings are created for each service ticket. In some embodiments where an error mapping is the numerical representation of the unique error messages, the error mapping can be used to fetch related historical service tickets having similar error mappings (e.g., past troubleshooting cases with similar error patterns). In this way, error mappings can be used to identify error patterns in a troubleshooting case so that similar historic troubleshooting cases can be identified and retrieved using the error mappings.

The error resolution module 102 performs various types of pattern matching between error mappings (signatures). The error mappings are the representation of unique error messages observed in a troubleshooting case. In some embodiments, an error mapping may be: [265, 383, 334]. For an incoming troubleshooting case, an error mapping is created and compared against error mappings within the global file 108 of past resolved troubleshooting cases. Various techniques may be used to identify relevant and/or closest matches, such as set intersection, longest common subsequence, and inverse document frequency.

In some embodiments of performing set intersection, the error mapping of an incoming troubleshooting case is compared against error mappings of past resolved troubleshooting cases such that the error mapping with the most common error tokens (a maximum overlap) is identified as a preferred match. The order of occurrence of the error tokens is not considered, and the weight assigned to error tokens gives all error tokens equal preference. Data structure 760 illustrates a test case of an error mapping for an incoming troubleshooting case with 3 error mapping matches: Test case: '2009802986': [[1613, 1133, 1134, 48, 105, 961]], and where the 3 matches are: '2009813506': (3, [1133, 1134, 961]), '2009781760': (3, [1613,1133, 1134]), and '2009654688': (3, [1133, 1134, 961], which indicates that 3 past service tickets (corresponding to the 3 error mappings) have 3 errors in common with the error mapping of the test case: '2009802986': [[1613, 1133, 1134, 48, 105, 961]]. Set intersection may be selectively utilized when unique error matches are a priority, and the suggestions (e.g., suggested troubleshooting actions) with more error matches are preferred.

In some embodiments of performing the longest common subsequence, the error mapping of an incoming troubleshooting case is compared against error mappings of past resolved troubleshooting cases such that the longest subsequence common to the error mapping of an incoming troubleshooting case is given preference (e.g., assigned a higher weight). Data structure 770 illustrates a test case of an error mapping for an incoming troubleshooting case where Test case: '2009802986': [[1613, 1133, 1134, 48, 105, 961]], and the 3 matches are: '2009781760': (3, [1613, 1133, 1134]), '2009654688': (2, [1133, 1134], and '2009813506': (2, [1133, 1134]). When comparing the error mapping of the incoming troubleshooting case (e.g., Test case: '2009802986': [[1613, 1133, 1134, 48, 105, 961]]) with the historic error mappings, the longest subsequence common to the error mapping of the incoming troubleshooting case is given preference. The order of the errors is given preference and especially for troubleshooting cases where the sequence of error occurrence is important. The first match of [1613, 1133, 1134] is weighted with 3 because 3 index values are in common, while the second match of [1133, 1134] is weighted with 2 because merely 2 index values are in common.

In some embodiments of performing inverse document frequency, certain error tokens may be weighted less compared to other error tokens such as where a smaller weight is assigned to errors/warnings that occur multiple times in a log and/or where there is little to no effect of these errors/warnings on the actual error report compared to rarely occurring errors/warnings. Inverse document frequency is useful in situations where the importance for an error token relates to the frequency of occurrence in a corpus such as across historic troubleshooting cases. Data structure 780 illustrates a test case of an error mapping for an incoming troubleshooting case where Test case: '2009802986': [1613, 1133, 1134, 48, 105, 961], and the 3 matches are: '2009813506': (3, [('1133', 5.30), ('1134', 5.51), ('961', 4.69)])—0.36, '2009781760': (3, [('1613', 6.14), ('1133', 5.30), ('1134', 5.51)])—0.33, and '2009654688': (3, [('1133', 5.30), ('1134', 5.51), ('961', 4.69)]), such as where index value '1133' has a weight of 5.3 based upon frequency of a corresponding error message occurring within troubleshooting cases.

The error resolution module 102 improves upon conventional error identification and troubleshooting techniques by assign weights to different errors. With the top matches from the global file 108 in relation to an error mapping of an incoming troubleshooting case, troubleshooting instructions (e.g., troubleshooting instruction 800 of FIG. 8), summaries of results, suggestions, and troubleshooting actions can be recommended or implemented. The troubleshooting instructions 800 may include a summary of suggested historic troubleshooting cases that were most similar to the incoming troubleshooting case, along with suggested knowledge base articles to view.

The disclosed techniques save a significant amount of time and manual effect in extracting relevant logs from bundles and filtering error messages. Logs can be analyzed for customers in a secure manner where sensitive data can be masked by the error resolution module 102. The error resolution module 102 can detect new errors and error patterns in logs, which can help identify defects to resolve. The error resolution module 102 can differentiate between meaningful errors and noise in logs. The error resolution module 102 can help identify redundant knowledge base articles that refer to the same error/problem in order to deduplicate the knowledge base articles.

Figure 2:
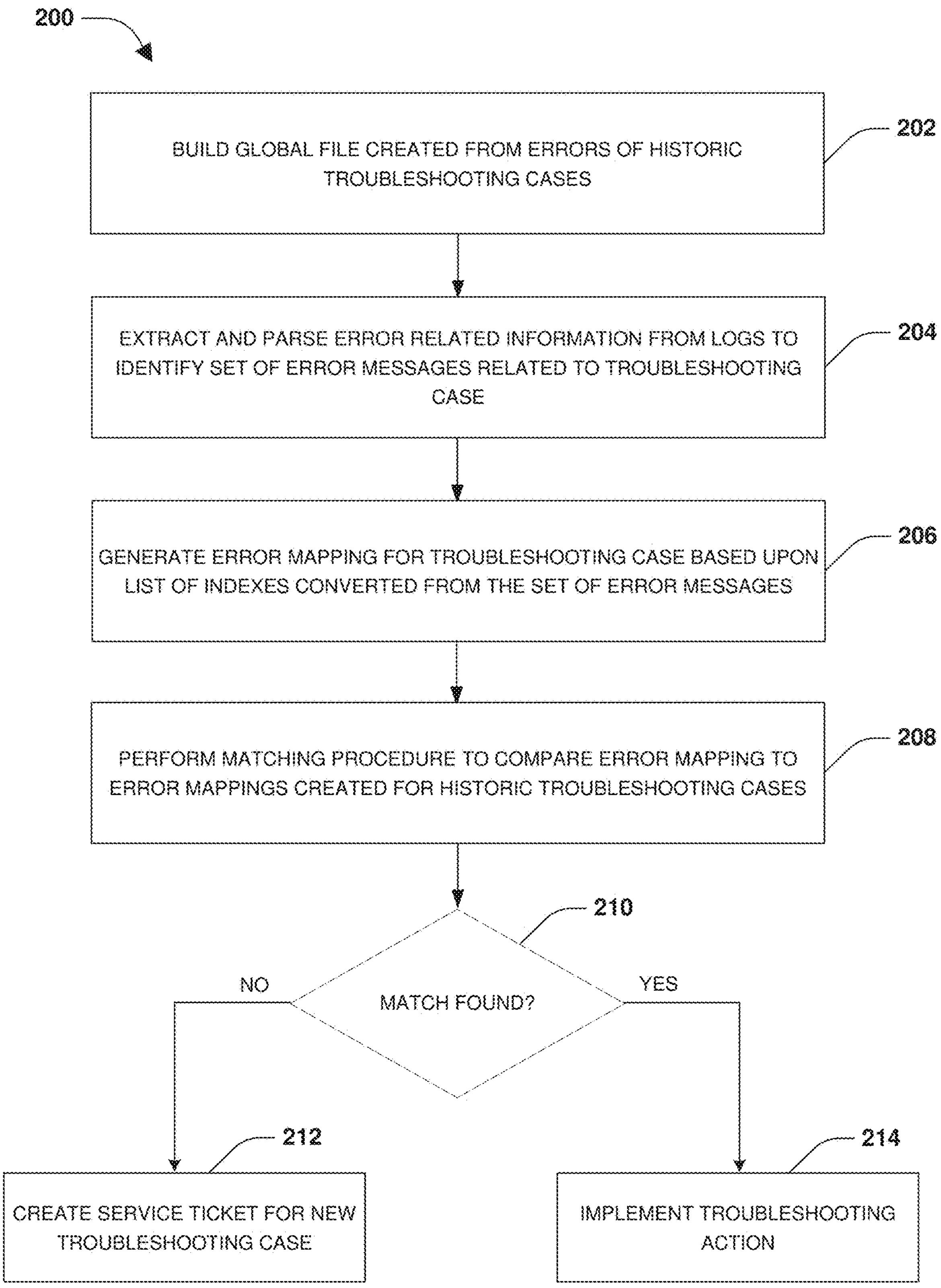
FIG. 2 is a flow chart illustrating an embodiment of a method for AI based application error detection and resolution in accordance with various embodiments of the present technology.
Figure 3:
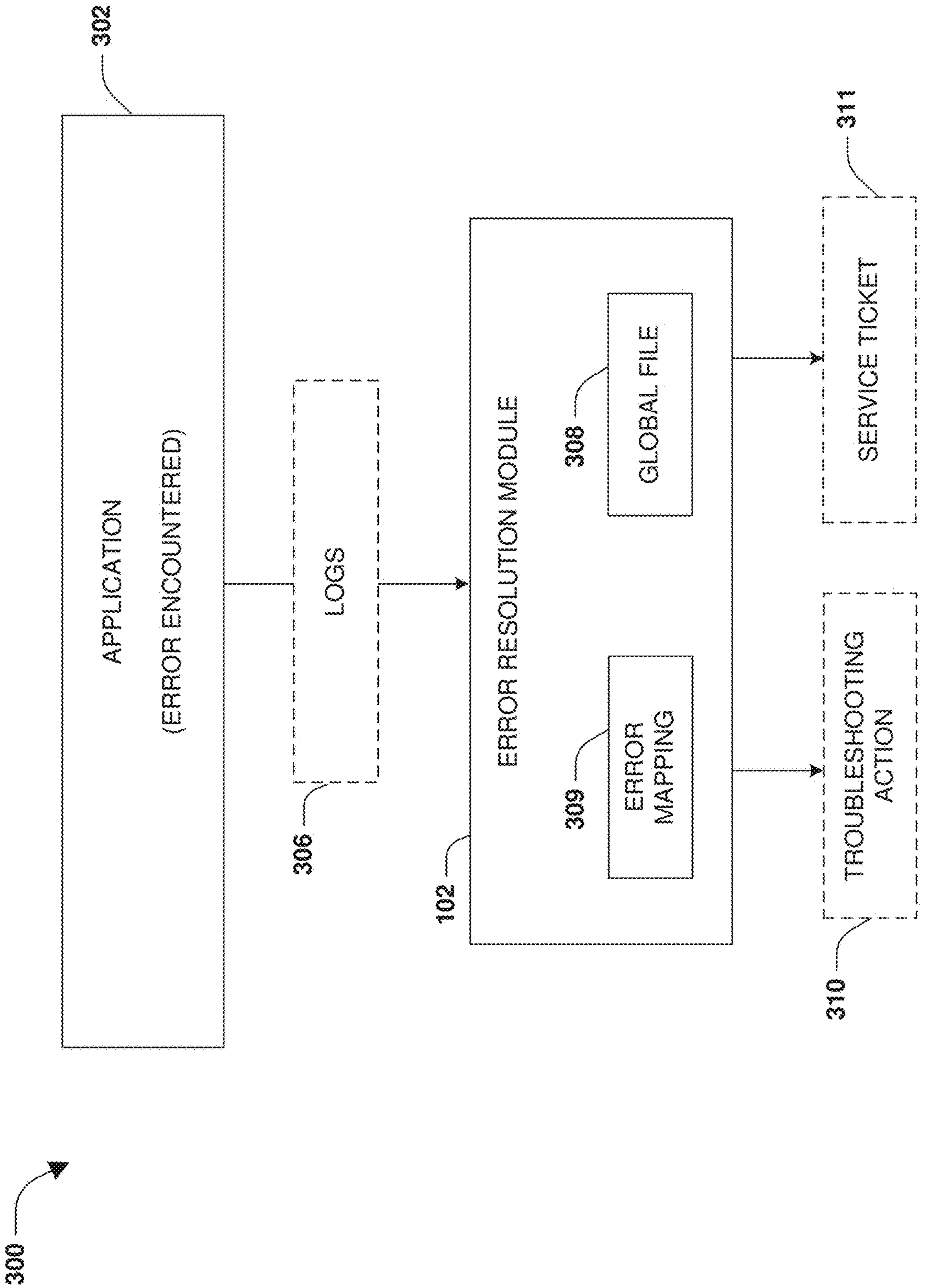
FIG. 3 is a block diagram illustrating an embodiment of a system for AI based application error detection and resolution in accordance with an embodiment of the present technology.
Figure 4:
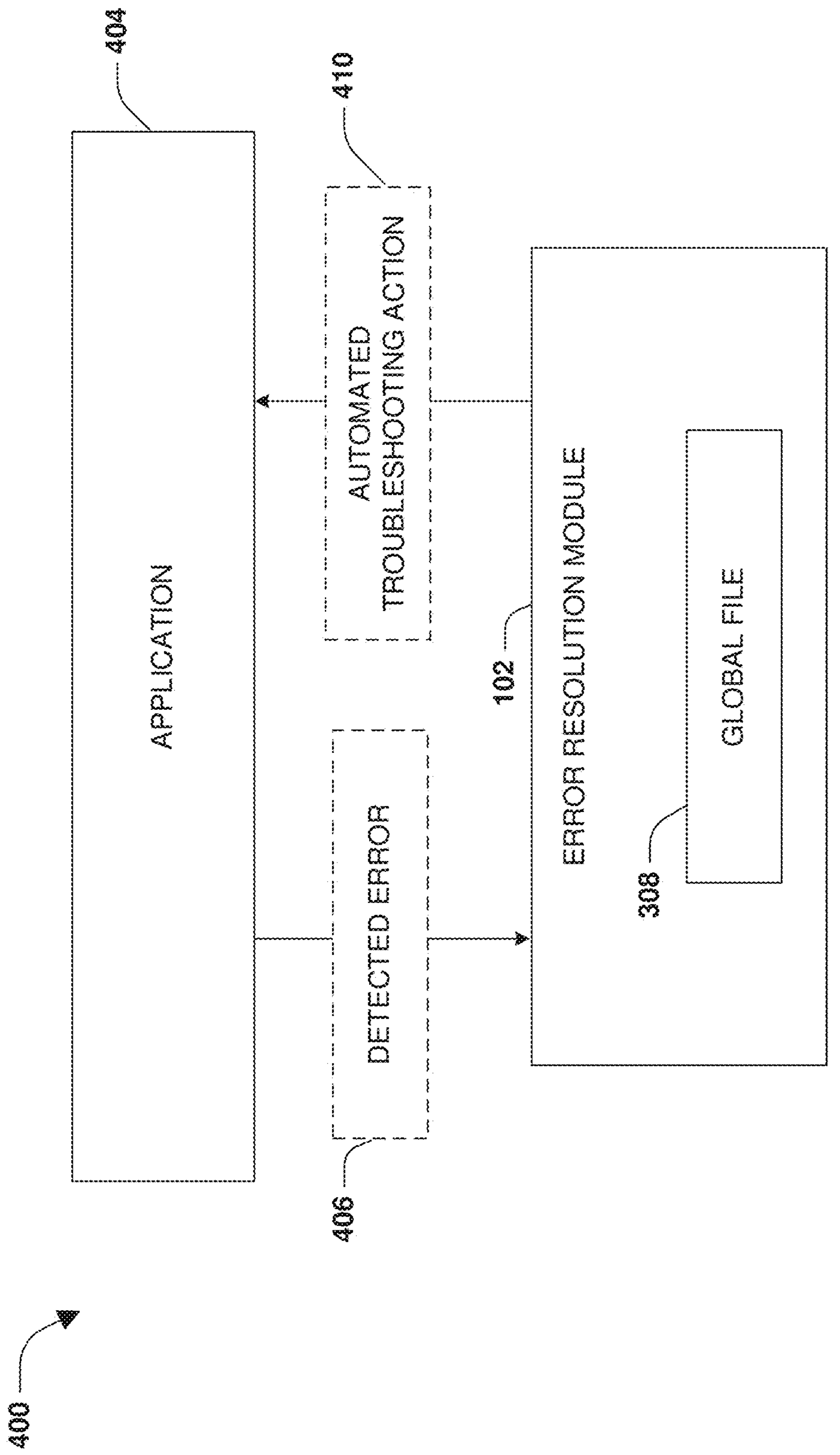
FIG. 4 is a block diagram illustrating an embodiment of a system for AI based application error detection and resolution in accordance with an embodiment of the present technology.
Figure 5:
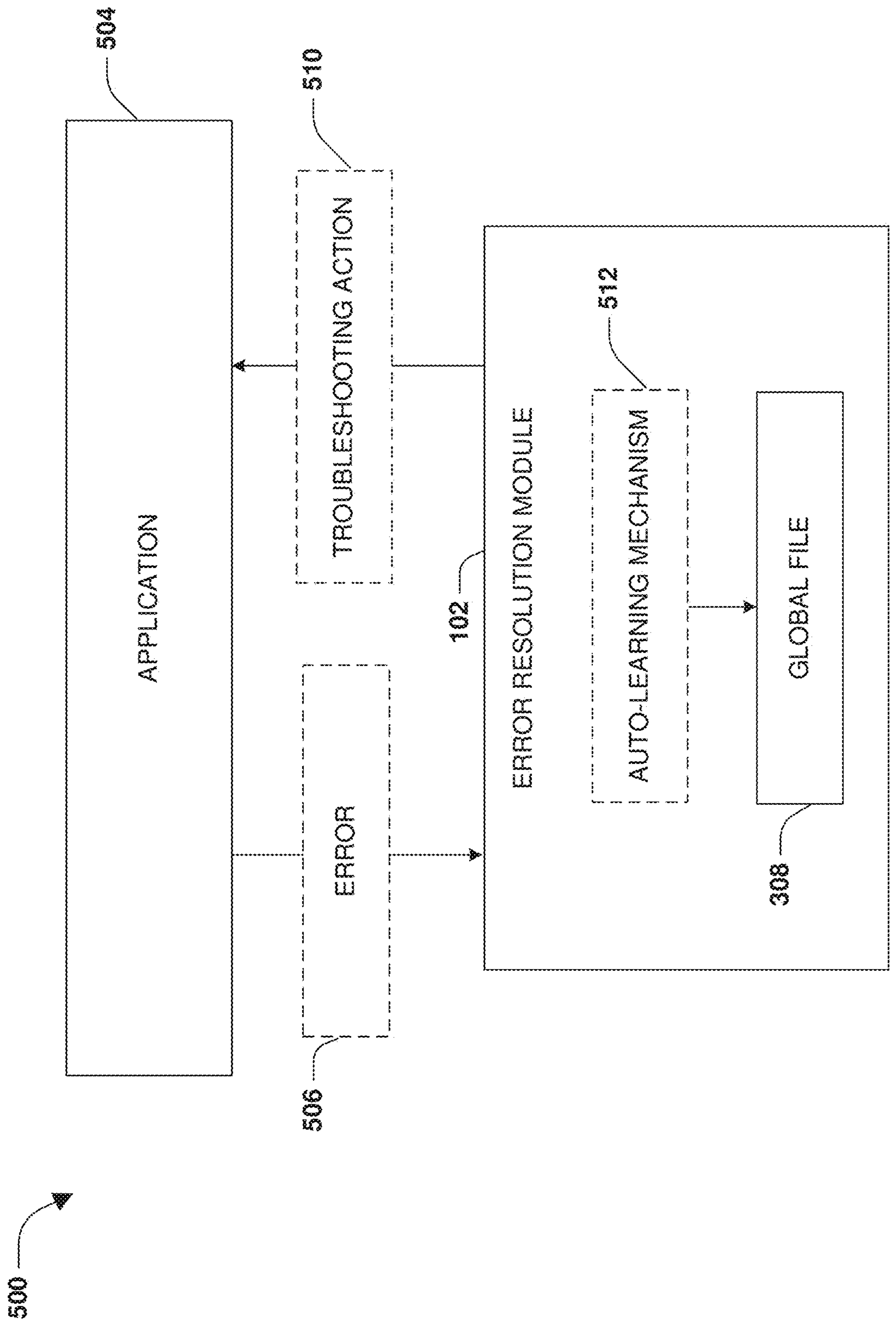
FIG. 5 is a block diagram illustrating an embodiment of a system for AI based application error detection and resolution in accordance with an embodiment of the present technology.

FIG. 2 is a flow chart illustrating an embodiment of a method for AI based application error detection and resolution, which is described in relation to system 300 of FIG. 3, system 400 of FIG. 4, and system 500 of FIG. 5. An application 302 may be executing on a computing device, which may be located on-premises or within a cloud computing environment (e.g., the application 302 hosted as Software-as-a-Service). During execution, various operational information, errors, debugging information, and/or any other information related to the operation of the application 302 may be stored within logs 306. The error resolution module 102 may be implemented to troubleshoot any errors related to the application 302 by executing the method 200.

During operation 202 of method 200, a global file 308 may be created from errors of historic troubleshooting cases. The global file 308 may be created based upon the techniques previously described in relation to system 100 of FIG. 1. The global file 308 may be used to represent unique error messages observed for an application problem. In some embodiments, the global file 308 is created to consist of unique error messages based upon errors extracted from logs of past service tickets, notes sections of the past service tickets, and knowledge base articles. In some embodiments, pre-processed documents of error messages (e.g., pre-processing to remove timestamps, user specific information, and/or duplicate error messages) are iterated through using word embeddings to represent words in the pre-processed documents and similarity thresholds to determine whether the error messages are already represented by the global file 308. One or more error messages of the pre-processed documents are added to the global file 308 based upon the one or more error messages not being represented by the global file 308. An embodiment 740 of the global file 308 is illustrated by FIG. 7B.

The error resolution module 102 may be triggered to troubleshoot the application 302 such as in response to the application 302 encountering an error or a troubleshooting case being created for the application 302 (e.g., a service ticket being generated based upon a customer reporting an issue with the application 302). During operation 204 of method 200, the error resolution module 102 extracts error related information from the logs 306. If the logs are maintained as secure logs with restricted access, then the error resolution module 102 may identify and mask sensitive data within the secure logs (e.g., remove or redact social security information, dates of birth, social security numbers, etc.). The error related information is identified as information corresponding to the troubleshooting case for the application 302. In some embodiments, the error related information is pre-processed. Basic pre-processing may be performed to removed user specific information (e.g., names, IP addresses, host names, etc.) and/or timestamps if the troubleshooting case is of the type that does not rely upon timestamp information in order to troubleshoot and solve. Advanced pre-processing may be performed to remove duplicate error messages in order to create a set of deduplicated error messages. Words within the error messages may be represented as word embeddings that are processed by natural language processing or other processing that can identify similar error messages (e.g., two error messages may be considered duplicate error messages if a similarity between the two error messages exceeds a threshold). In this way, the pre-processed error related information is parsed to identify a set of error messages related to the troubleshooting case.

During operation 206 of method 200, an error mapping 309 is generated for the troubleshooting case based upon a list of indexes that are converted from the set of error messages. That is, the set of error messages are converted into a list of indexes corresponding to the global file 308 created from the errors of historic troubleshooting cases. For example, a plurality of error messages from the logs 306 are processed to convert a list of error vectors (e.g., each error message may be transformed into an error vector) into the list of indexes corresponding to the global file 308. Each error message may be mapped to an index value through the global file 308 (e.g., error message "there was a problem posting the autosupport message" is mapped to index value 265). In some embodiments, a vector-based similarity scoring function is utilized to calculate similarity scores for pre-processed error messages in comparison with existing error messages within the global file 308. An error message is selected within the global file 308 based upon the existing error message having a highest similar score with respect to a pre-processed error message from the set of error messages. In this way, an index value of the existing error message is assigned to the pre-processed error message. Thus, a list of indexes (index values) is determined and used to create the error mapping 309 (e.g., the error mapping 309 including a list of index values such as [265, 1133, 1134, 48, 105, 961]).

During operation 208 of method 200, a matching process is performed to compare the error mapping 309 of the troubleshooting case to error mappings created for the historic troubleshooting cases using the global file 308. The matching process generates an output corresponding to how similar the error mapping 309 of the troubleshooting case is to the error mappings for the historic troubleshooting cases. The matching procedure may assign weights to error tokens represented as the error mappings such that certain error tokens may be given more consideration/weight than other error tokens in terms of how similar the error mapping 309 of the troubleshooting case is to the error mappings for the historic troubleshooting cases. In some embodiments, the matching procedure is used to map incoming problem errors (e.g., the error encountered by the application 302, which is represented by the error mapping 309) with resolved service tickets (e.g., service tickets of the historic troubleshooting cases represented by the error mappings of the historic troubleshooting cases). In some embodiments, an error token corresponds to an index of an error messages (e.g., an index value 265 within the error mapping 309 for the troubleshooting case)

In some embodiments, the matching procedure is implemented as a set intersection function that identifies error mappings that have a maximum overlap of error tokens of the error mappings of the historic troubleshooting cases with error tokens of the error mapping 309 for the troubleshooting case. Thus, all error tokens are given the same weight, and the output will identify a historic troubleshooting case that has an error mapping with the most error tokens in common with the error tokens for the error mapping 309.

In some embodiments, the matching procedure is implemented as a longest common sequence of error tokens of the error mappings of the historic troubleshooting cases with error tokens for the error mapping 309 for the troubleshooting case. Thus, if a sequence of error tokens match between the error mapping 309 and an error mapping of a historic troubleshooting case (e.g., a sequence of 3 matching error tokens between two error mappings [123, 22, 322, 555, 683, 821] and [34, 22, 322, 555, 777, 67]), then the error tokens are assigned a larger weight than where merely a single error token or two error tokens of a sequence of error tokens matches between error mapping 309 and an error mapping of a historic troubleshooting case (e.g., merely 256 matches between the two error mappings [444, 333, 666, 256, 888, 999] and [111, 441, 532, 256, 783, 123]). The longer the sequence or matching error tokens, the larger the weight/consideration given when determining similarity/match.

In some embodiments, the matching procedure is implemented as an inverse document frequency function that assigns reduced weights for error tokens that occur more frequently than other error tokens in the global file 308 or the error mappings of the historic troubleshooting cases. The more frequently an error token occurs, the less weight/consideration given when determining similarity/match.

During operation 210 of method 200, the output is evaluated to determine whether there is a match between the error mapping 309 and any error mappings of the historic troubleshooting cases. If no match is found, then a new service ticket 311 is created for the troubleshooting cases, during operation 212 of method 200. That is, the troubleshooting case does not match any previously resolved historic troubleshooting cases, and thus may relate to a new issue to troubleshoot (e.g., the troubleshooting case relates to an error without a currently defined solution). In some embodiments, the service ticket 311 may be escalated for advanced troubleshooting and skips basic troubleshooting (e.g., the service ticket 311 is redirected to an engineering team for advanced troubleshooting).

If a match is found, then a troubleshooting action 310 may be implemented, during operation 214 of method 200. The troubleshooting action 310 may be associated with a historic troubleshooting case identified as the match for the troubleshooting case for the application 302 (e.g., a historic troubleshooting case with an error mapping most similar to the error mapping 309). In some embodiments, the troubleshooting action 310 may be executed as a computer implemented command that modifies operation of the application and/or a computing device hosting the application (e.g., modification of a configuration parameter, installation of a patch or update, rebooting the computing device, resetting a network connection, etc.). In some embodiments, the computer implemented command is executed by an auto-heal mechanism incorporated into the application 302. In some embodiments, the troubleshooting action 310 is executed to display troubleshooting instructions to a user associated with the application 302. The troubleshooting instructions may be derived from troubleshooting resolution steps performed for the historic troubleshooting case. In some embodiments, a summary describing or linking to the historic troubleshooting case and/or suggested knowledge base articles for resolving the troubleshooting case for the application 302 is generated and provided to the user.

FIG. 4 is a block diagram illustrating an embodiment of a system 400 for AI based application error detection and resolution. The error resolution module 102 may be configured to detect errors 406 associated with the execution of an application 404 in real-time as the application is executing. In some embodiments, the error resolution module 102 may be incorporated into the application 404 or may be hosted external to the application 404 such as on a computing device executing the application 404 or a different computing device. The error resolution module 102 may perform the method 200 in order to identify a troubleshooting action 410, and may be automatically implemented by the error resolution module 102 for the application 404. In this way, errors may be automatically identified and resolved by the error resolution module 102 without manual intervention such as where a customer must report an error, a service ticket is generated, and various level of troubleshooting are performed to resolve the error, which is time consuming and results in extended downtime for the application 404 that could be providing business critical functions.

FIG. 5 is a block diagram illustrating an embodiment of a system 500 for AI based application error detection and resolution. In some embodiments, the error resolution module 102 may be configured to detect or receive notification of errors 506 associated with the execution of an application 504. In some embodiments, the error resolution module 102 may be incorporated into the application 504 or may be hosted external to the application 504 such as on a computing device executing the application 504 or on a different computing device. The error resolution module 102 may perform the method 200 in order to identify a troubleshooting action 510 to implement. The error resolution module 102 may implement an auto-learning mechanism 512 in order to incorporate new error messages into the global file 308 and/or create new error mappings for recently resolved troubleshooting cases. That is, if the error resolution module 102 detects an unmapped error based upon an error mapping, the unmapped error not exceeding a similarity threshold with respect to error mappings of historic troubleshooting cases, then error messages of the unmapped error are added into the global file 308. The auto-learning mechanism 512 may learn new error mappings on a periodic basis while processing incoming troubleshooting cases.

Figure 6:
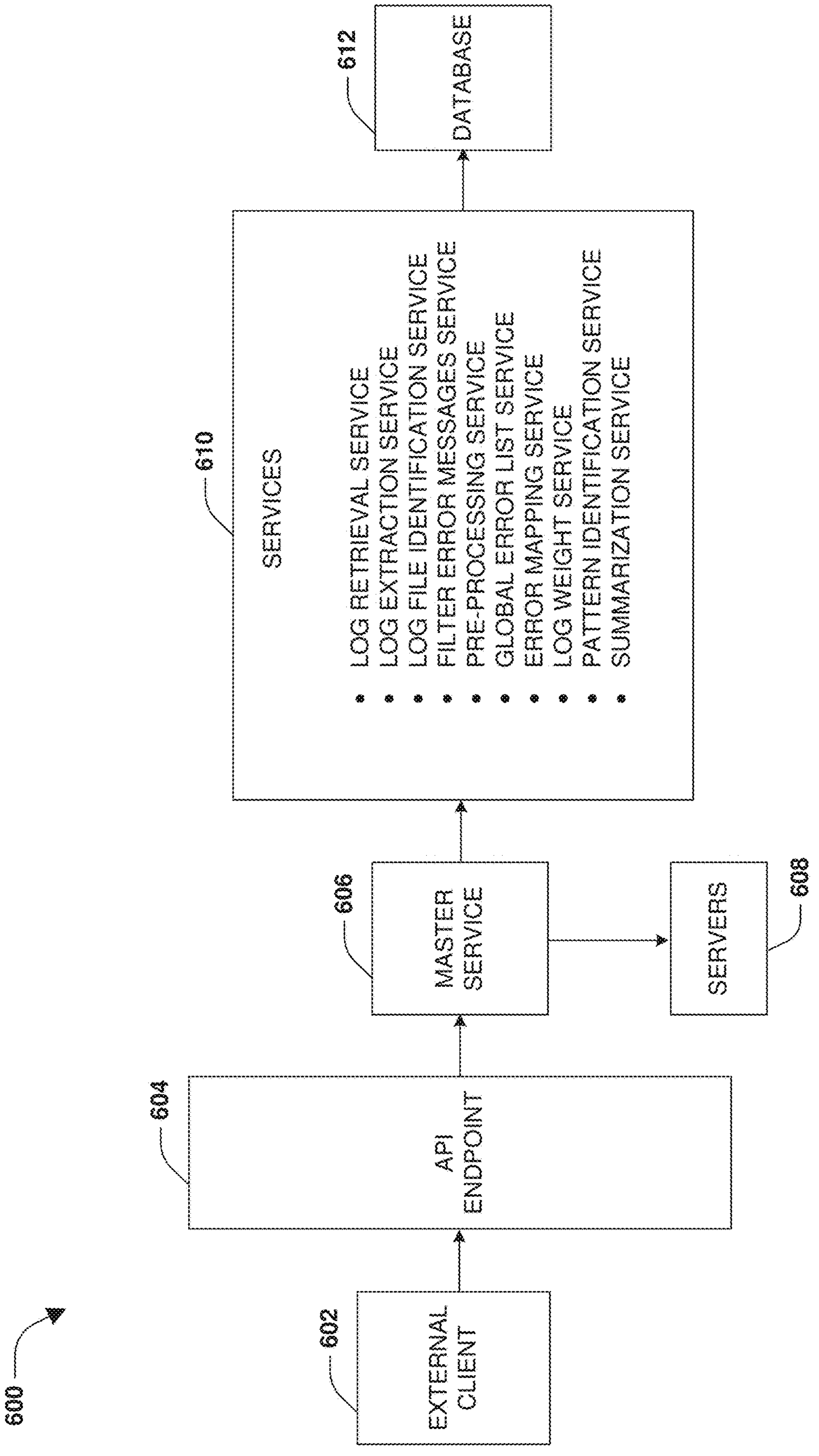
FIG. 6 is a block diagram illustrating an embodiment of a system for AI based application error detection and resolution utilizing a plurality of individual services in accordance with an embodiment of the present technology.

FIG. 6 is a block diagram illustrating an embodiment of a system 600 for AI based application error detection and resolution utilizing a plurality of individual services 610. The system 600 may implemented functionality of the error resolution module 102 and/or method 200 as individual services 610 that can be individually invoked through a master service 606. The master service 606 and/or the services 610 may be hosted on servers 608 and/or store data within a database 612 (e.g., storing a global file, error mappings, historic troubleshooting cases and resolution to solve the historic troubleshooting cases, etc.). External clients 602 may be capable of interfacing with the master service 606 through an application programming interface (API) endpoint 604. The master service 606 may provide individual access to a log retrieval service for retrieving logs associated with an application (e.g., retrieve logs from on-premises, a cloud environment, etc.), a log extraction service to extract error messages from the logs, a log file identification service, a filter error messages service to identify and/or filter error messages, a pre-processing service to remove timestamps, client specific information, and/or duplicate error messages, a global error list service to create and provide access to a global file of error messages, an error mapping service to generate error mappings, a log weight service to weight error tokens as part of a matching procedure, a pattern identification service to identify similar patterns between error mappings, and a summarization service to provide a summary of troubleshooting instructions.

In some embodiments, the services 610 may be invoked to detect duplicate knowledge base articles and/or defective service tickets (e.g., duplicate tickets), which may be removed such as from the database 612. In some embodiments, the services 610 may be invoked to identify error messages occurring within logs above a threshold frequency. If an error message corresponds to a first type of error (e.g., an important or critical error to resolve), then an action is automatically implemented to address the error. If an error message has a second type of error (e.g., a non-critical error or unknown error type), then the error message may be removed from the logs as the error message may not be relevant for troubleshooting errors. In some embodiments, the services 610 may be invoked as part of a quality of assurance test for an application in order to identify and auto-triage a troubleshooting case as a known issue. In this way, the services 610 may be individually invoked in order to perform a variety of tasks.

In some embodiments, a method is provided. The method includes extracting error related information from logs associated with an application, wherein the error related information corresponds to a troubleshooting case for the application; parsing the error related information to identify a set of error messages related to the troubleshooting case; converting the set of error messages into a list of indexes corresponding to a global file created from errors of historic troubleshooting cases; generating an error mapping for the troubleshooting case using the global file, wherein the error mapping is populated with the list of indexes; performing a matching procedure to compare the error mapping of the troubleshooting case to error mappings created for the historic troubleshooting cases using the global file to generate an output; and in response to the output corresponding to a historic troubleshooting case, implementing a troubleshooting action associated with the historic troubleshooting case to address the troubleshooting case for the application.

In some embodiments, the method comprises implementing the matching procedure as a set intersection function that identifies error mappings that have a maximum overlap of error tokens with error tokens of the error mapping for the troubleshooting case, wherein an error token corresponds to an index of an error message of the set of error messages.

In some embodiments, the method comprises implementing the matching procedure as a longest common subsequence function that identifies error mappings that have a longest common sequence of error tokens with error tokens of the error mapping for the troubleshooting case, wherein an error token corresponds to an index of an error message of the set of error messages.

In some embodiments, the method comprises implementing the matching procedure as an inverse document frequency function that assigns reduced weights to error tokens that occur more frequently than other error tokens within the global file, wherein an error token corresponds to an index of an error message of the set of error messages.

In some embodiments, the method comprises in response to the output not corresponding to a historic troubleshooting case, determining that the troubleshooting case for the application relates to an error without a currently defined solution; and generating a service ticket for the troubleshooting case.

In some embodiments, the method comprises escalating the service ticket for advance troubleshooting, wherein the service ticket is escalated to skip basic troubleshooting.

In some embodiments, the method comprises executing the troubleshooting action as a computer implemented command to modify operation a computing device hosting the application.

In some embodiments, the method comprises executing the troubleshooting action to display troubleshooting instructions to a user associated with the application.

In some embodiments, the method comprises pre-processing the error related information, prior to parsing the error related information, to remove timestamps and user specific information from the error related information.

In some embodiments, the method comprises pre-processing, utilizing word embeddings and/or natural language processing, the error related information, prior to parsing the error related information to deduplicate error messages to remove duplicate error messages to create a set of deduplicated error messages, wherein the parsing the error related information comprises parsing the deduplicated error messages.

In some embodiments, a computing device is provided. The computing device comprises a memory comprising machine executable code; and a processor coupled to the memory, the processor configured to execute the machine executable code to cause the machine to perform operations comprising: extracting error related information from logs associated with an application, wherein the error related information corresponds to a troubleshooting case for the application; parsing the error related information to identify a set of error messages related to the troubleshooting case; converting the set of error messages into a list of indexes corresponding to a global file created from errors of historic troubleshooting cases; generating an error mapping for the troubleshooting case using the global file, wherein the error mapping is populated with the list of indexes; performing a matching procedure to compare the error mapping of the troubleshooting case to error mappings created for the historic troubleshooting cases using the global file to generate an output; and in response to the output corresponding to a historic troubleshooting case, implementing a troubleshooting action associated with the historic troubleshooting case to address the troubleshooting case for the application.

In some embodiments, the machine executable code causes the machine to utilize the matching procedure to assign weights to error tokens represented as the error mappings.

In some embodiments, the machine executable code causes the machine to utilize the global file to represent unique error messages observed for an application problem.

In some embodiments, the machine executable code causes the machine to utilize a vector-based similarity scoring function to calculate similarity scores for pre-processed error messages in comparison with existing error messages within the global file; select an existing error message within the global file that has a highest similarity score with respect to a pre-processed error message; and assign an index of the existing error message to the pre-processed error message.

In some embodiments, the machine executable code causes the machine to process a plurality of error messages from the logs to convert a list of error vectors into the list of indexes corresponding to the global file.

In some embodiments, the machine executable code causes the machine to create the global file consisting of unique error messages based upon errors extracted from logs of past service tickets, notes sections of the past service tickets, and knowledge base articles.

In some embodiments, a non-transitory machine readable medium is provided. The non-transitory machine readable medium comprises instructions for performing a method, which when executed by a machine, causes the machine to perform operations comprising: extracting error related information from logs associated with an application, wherein the error related information corresponds to a troubleshooting case for the application; parsing the error related information to identify a set of error messages related to the troubleshooting case; converting the set of error messages into a list of indexes corresponding to a global file created from errors of historic troubleshooting cases; generating an error mapping for the troubleshooting case using the global file, wherein the error mapping is populated with the list of indexes; performing a matching procedure to compare the error mapping of the troubleshooting case to error mappings created for the historic troubleshooting cases using the global file to generate an output; and in response to the output corresponding to a historic troubleshooting case, implementing a troubleshooting action associated with the historic troubleshooting case to address the troubleshooting case for the application.

In some embodiments, the instructions cause the machine to: iterate through pre-processed documents of error messages using word embeddings and similarity thresholds to determine whether the error messages are already represented by the global file; and add one or more error messages of the pre-processed documents to the global file based upon the one or more error messages not being represented by the global file.

In some embodiments, the instructions cause the machine to utilize the matching procedure to map incoming problem errors with resolved service tickets based upon error patterns; and utilize troubleshooting actions to resolve incoming troubleshooting cases.

In some embodiments, the instructions cause the machine to generate a summary describing or linking to historic troubleshooting cases and suggested knowledgebase articles for resolving the troubleshooting case for the application; and display the troubleshooting action as the summary to a user associated with the application.

In some embodiments, the instructions cause the machine to detect that the error mapping is an unmapped error based upon the error mapping not exceeding a similarity threshold with respect to the error mappings of the historic troubleshooting cases.

In some embodiments, the instructions cause the machine to utilize the error mappings to detect at least one of a duplicate knowledge base article or a defective service ticket; and remove the least one of the duplicate knowledge base article or the defective service ticket.

In some embodiments, the instructions cause the machine to identify an error message occurring within logs above a threshold; in response to the error message corresponding to a first type of error, implement an action to address an error associated with the error message; and in response to the error message corresponding to a second type of error, remove the error message from the logs.

In some embodiments, the instructions cause the machine to implement, through an auto-heal mechanism incorporated into the application, the troubleshooting action.

In some embodiments, the instructions cause the machine to in response to detecting that the logs are maintained as secure logs with restricted access, identify and mask sensitive data within the secure logs.

In some embodiments, the instructions cause the machine to execute a quality of assurance test for the application to identify and auto-triage the troubleshooting case as a known issue.

In some embodiments, the instructions cause the machine to execute an auto-learning mechanism on a periodic basis to learn new error mappings identified while processing incoming troubleshooting cases.

Figure 9:
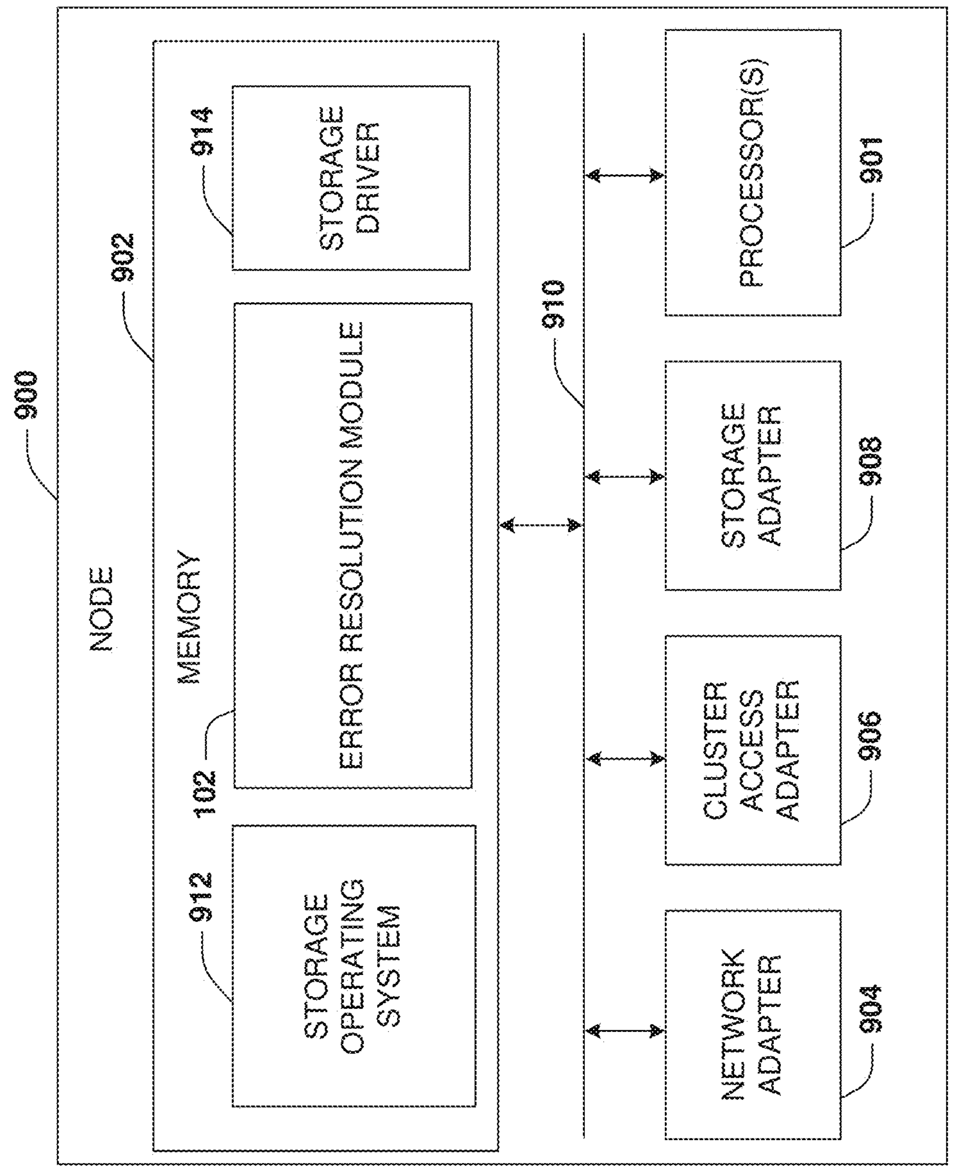
FIG. 9 is a block diagram illustrating an example of a node in accordance with various embodiments of the present technology.

Referring to FIG. 9, a node 900 (also referred to as a storage node) in this particular example includes processor(s) 901, a memory 902, a network adapter 904, a cluster access adapter 906, and a storage adapter 908 interconnected by a system bus 910. In other examples, the node 900 comprises a virtual machine, such as a virtual storage machine.

The node 900 also includes a storage operating system 912 installed in the memory 902 that can, for example, implement a RAID data loss protection and recovery scheme to optimize reconstruction of data of a failed disk or drive in an array, along with other functionality such as deduplication, snapshot creation, data mirroring, synchronous replication, asynchronous replication, encryption, etc.

The network adapter 904 in this example includes the mechanical, electrical and signaling circuitry needed to connect the node 900 to one or more of the client devices over network connections, which may comprise, among other things, a point-to-point connection or a shared medium, such as a local area network. In some examples, the network adapter 904 further communicates (e.g., using Transmission Control Protocol/Internet Protocol (TCP/IP)) via a cluster fabric and/or another network (e.g., a WAN (Wide Area Network)) (not shown) with storage devices of a distributed storage system to process storage operations associated with data stored thereon.

The storage adapter 908 cooperates with the storage operating system 912 executing on the node 900 to access information requested by one of the client devices (e.g., to access data on a data storage device managed by a network storage controller). The information may be stored on any type of attached array of writeable media such as magnetic disk drives, flash memory, and/or any other similar media adapted to store information.

In exemplary data storage devices, information can be stored in data blocks on disks. The storage adapter 908 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 908 and, if necessary, processed by the processor(s) 901 (or the storage adapter 908 itself) prior to being forwarded over the system bus 910 to the network adapter 904 (and/or the cluster access adapter 906 if sending to another node computing device in the cluster) where the information is formatted into a data packet and returned to a requesting one of the client devices and/or sent to another node computing device attached via a cluster fabric. In some examples, a storage driver 914 in the memory 902 interfaces with the storage adapter to facilitate interactions with the data storage devices.

The storage operating system 912 can also manage communications for the node 900 among other devices that may be in a clustered network, such as attached to the cluster fabric. Thus, the node 900 can respond to client device requests to manage data on one of the data storage devices or storage devices of the distributed storage system in accordance with the client device requests.

A file system module of the storage operating system 912 can establish and manage one or more file systems including software code and data structures that implement a persistent hierarchical namespace of files and directories, for example. As an example, when a new data storage device (not shown) is added to a clustered network system, the file system module is informed where, in an existing directory tree, new files associated with the new data storage device are to be stored. This is often referred to as "mounting" a file system.

In the example node 900, memory 902 can include storage locations that are addressable by the processor(s) 901 and adapters 904, 906, and 908 for storing related software application code and data structures. The processor(s) 901 and adapters 904, 906, and 908 may, for example, include processing elements and/or logic circuitry configured to execute the software code and manipulate the data structures.

The storage operating system 912, portions of which are typically resident in the memory 902 and executed by the processor(s) 901, invokes storage operations in support of a file service implemented by the node 900. Other processing and memory mechanisms, including various computer readable media, may be used for storing and/or executing application instructions pertaining to the techniques described and illustrated herein.

In some embodiments, the error resolution module 102 is implemented by the node 900 in order to perform AI based application error detection and resolution.

The examples of the technology described and illustrated herein may be embodied as one or more non-transitory computer or machine readable media, such as the memory 902, having machine or processor-executable instructions stored thereon for one or more aspects of the present technology, which when executed by processor(s), such as processor(s) 901, cause the processor(s) to carry out the steps necessary to implement the methods of this technology, as described and illustrated with the examples herein. In some examples, the executable instructions are configured to perform one or more steps of a method described and illustrated later.

Figure 10:
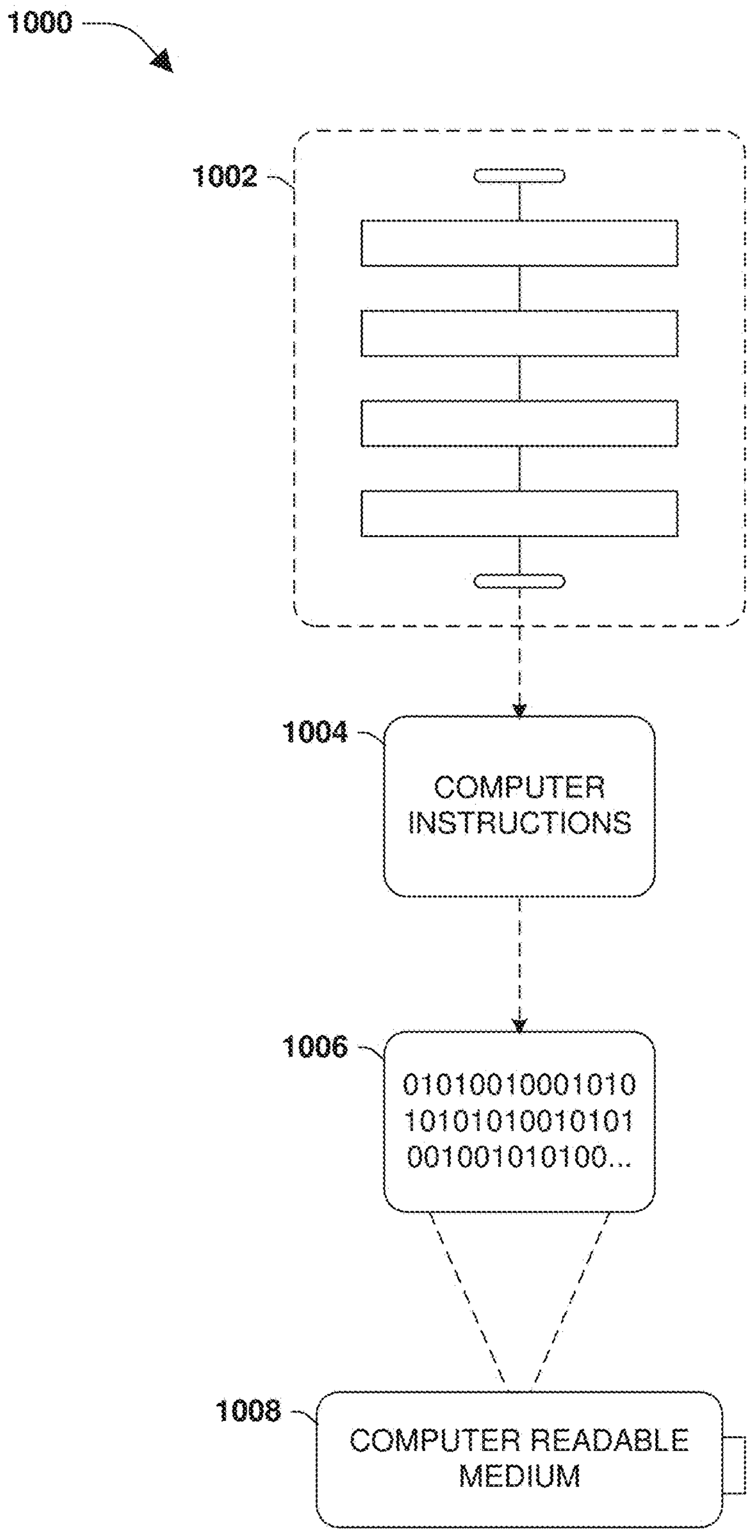
FIG. 10 is an example of a computer readable medium in accordance with various embodiments of the present technology.

FIG. 10 is an example of a computer readable medium 1000 in which various embodiments of the present technology may be implemented. An example embodiment of a computer-readable medium or a computer-readable device that is devised in these ways is illustrated in FIG. 10, wherein the implementation comprises a computer-readable medium 1008, such as a compact disc-recordable (CD-R), a digital versatile disc-recordable (DVD-R), flash drive, a platter of a hard disk drive, etc., on which is encoded computer-readable data 1006. The computer-readable data 1006, such as binary data comprising at least one of a zero or a one, in turn comprises processor-executable computer instructions 1004 configured to operate according to one or more of the principles set forth herein. In some embodiments, the processor-executable computer instructions 1004 are configured to perform at least some of the exemplary methods 1002 disclosed herein, such as method 200 of FIG. 2, for example. In some embodiments, the processor-executable computer instructions 1004 are configured to implement a system, such as at least some of the exemplary systems disclosed herein, such as system 100 of FIG. 1, system 300 of FIG. 3, system 400 of FIG. 4, system 500 of FIG. 5, and/or system 600 of FIG. 6, for example. Many such computer-readable media are contemplated to operate in accordance with the techniques presented herein.

In some embodiments, the described methods and/or their equivalents may be implemented with computer executable instructions. Thus, in some embodiments, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In some embodiments, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW) s, DVDs, magnetic tape, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:

extracting, from logs, error related information associated with troubleshooting case for an application;

executing an expression to parse the error related information to identify a set of error messages relevant to the troubleshooting case, wherein the expression is customized to the application based upon a logging mechanism used by a logging framework to log error messages into a plurality of logging levels of increasing order of severity, and wherein the expression selects a logging level from the plurality of logging levels for identifying the set of error messages relevant to the troubleshooting case;

converting the set of error messages into a list of indexes corresponding to a global file created from errors of historic troubleshooting cases;

generating an error mapping for the troubleshooting case using the global file, wherein the error mapping is populated with the list of indexes;

performing a matching procedure to compare the error mapping of the troubleshooting case to error mappings created for the historic troubleshooting cases using the global file to generate an output; and executing, through the application, a troubleshooting action associated with a historic troubleshooting case corresponding to the output.

2. The method of claim 1, comprising:

implementing the matching procedure as a set intersection function that identifies error mappings that have a maximum overlap of error tokens with error tokens of the error mapping for the troubleshooting case, wherein an error token corresponds to an index of an error message of the set of error messages.

3. The method of claim 1, comprising:

implementing the matching procedure as a longest common subsequence function that identifies error mappings that have a longest common sequence of error tokens with error tokens of the error mapping for the troubleshooting case, wherein an error token corresponds to an index of an error message of the set of error messages.

4. The method of claim 1, comprising:

implementing the matching procedure as an inverse document frequency function that assigns reduced weights to error tokens that occur more frequently than other error tokens within the global file, wherein an error token corresponds to an index of an error message of the set of error messages.

5. The method of claim 1, comprising:

in response to the output not corresponding to a historic troubleshooting case, determining that the troubleshooting case for the application relates to an error without a currently defined solution; and generating a service ticket for the troubleshooting case.

6. The method of claim 5, comprising:

escalating the service ticket for advance troubleshooting, wherein the service ticket is escalated to skip basic troubleshooting.

7. The method of claim 1, comprising:

executing the troubleshooting action to modify operation a computing device hosting the application.

8. The method of claim 1, comprising:

executing the troubleshooting action to display troubleshooting instructions to a user associated with the application.

9. The method of claim 1, comprising:

pre-processing the error related information, prior to parsing the error related information, to remove timestamps and user specific information from the error related information.

10. The method of claim 1, comprising:

pre-processing, utilizing word embeddings, the error related information, prior to parsing the error related information, to deduplicate error messages to remove duplicate error messages to create a set of deduplicated error messages, wherein parsing the error related information comprises parsing the deduplicated error messages.

11. A computing device, comprising:

a memory comprising machine executable code; and a processor coupled to the memory, the processor configured to execute the machine executable code to cause the machine to:

extract, from logs, error related information associated with a troubleshooting case for an application;

execute an expression to parse the error related information to identify a set of error messages relevant to the troubleshooting case, wherein the expression is customized to the application based upon a logging mechanism used by a logging framework to log error messages into a plurality of logging levels of increasing order of severity, and wherein the expression selects a logging level from the plurality of logging levels for identifying the set of error messages relevant to the troubleshooting case;

convert the set of error messages into a list of indexes corresponding to a global file created from errors of historic troubleshooting cases;

generate an error mapping for the troubleshooting case using the global file, wherein the error mapping is populated with the list of indexes;

perform a matching procedure to compare the error mapping of the troubleshooting case to error mappings created for the historic troubleshooting cases using the global file to generate an output; and execute, through the application, a troubleshooting action associated with a historic troubleshooting case corresponding to the output.

12. The computing device of claim 11, wherein the machine executable code causes the machine to:

utilize the matching procedure to assign weights to error tokens represented as the error mappings.

13. The computing device of claim 11, wherein the machine executable code causes the machine to:

utilize the global file to represent unique error messages observed for an application problem.

14. The computing device of claim 11, wherein the machine executable code causes the machine to:

utilize a vector-based similarity scoring function to calculate similarity scores for pre-processed error messages in comparison with existing error messages within the global file;

select an existing error message within the global file that has a highest similarity score with respect to a pre-processed error message; and assign an index of the existing error message to the pre-processed error message.

15. The computing device of claim 11, wherein the machine executable code causes the machine to:

process a plurality of error messages from the logs to convert a list of error vectors into the list of indexes corresponding to the global file.

16. The computing device of claim 11, wherein the machine executable code causes the machine to:

create the global file consisting of unique error messages based upon errors extracted from logs of past service tickets, notes sections of the past service tickets, and knowledge base articles.

17. A non-transitory machine readable medium comprising instructions for performing a method, which when executed by a machine, causes the machine to:

extract, from logs, error related information from logs associated with an application, a troubleshooting case for an application;

execute an expression to parse the error related information to identify a set of error messages relevant to the troubleshooting case, wherein the expression is customized to the application based upon a logging mechanism used by a logging framework to log error messages into a plurality of logging levels of increasing order of severity, and wherein the expression selects a logging level from the plurality of logging levels for identifying the set of error messages relevant to the troubleshooting case;

convert the set of error messages into a list of indexes corresponding to a global file created from errors of historic troubleshooting cases;

generate an error mapping for the troubleshooting case using the global file, wherein the error mapping is populated with the list of indexes;

perform a matching procedure to compare the error mapping of the troubleshooting case to error mappings created for the historic troubleshooting cases using the global file to generate an output; and execute, through the application, a troubleshooting action associated with a historic troubleshooting case corresponding to the output.

18. The non-transitory machine readable medium of claim 17, wherein the instructions cause the machine to:

iterate through pre-processed documents of error messages using word embeddings and similarity thresholds to determine whether the error messages are already represented by the global file; and add one or more error messages of the pre-processed documents to the global file based upon the one or more error messages not being represented by the global file.

19. The non-transitory machine readable medium of claim 17, wherein the instructions cause the machine to:

utilize the matching procedure to map incoming problem errors with resolved service tickets based upon error patterns; and utilize troubleshooting actions to resolve incoming troubleshooting cases.

20. The non-transitory machine readable medium of claim 17, wherein the instructions cause the machine to:

generate a summary describing or linking to historic troubleshooting cases and suggested knowledgebase articles for resolving the troubleshooting case for the application; and display the troubleshooting action as the summary to a user associated with the application.

21. The non-transitory machine readable medium of claim 17, wherein the instructions cause the machine to:

detect that the error mapping is an unmapped error based upon the error mapping not exceeding a similarity threshold with respect to the error mappings of the historic troubleshooting cases.

22. The non-transitory machine readable medium of claim 17, wherein the instructions cause the machine to:

utilize the error mappings to detect at least one of a duplicate knowledge base article or a defective service ticket; and remove the least one of the duplicate knowledge base article or the defective service ticket.

23. The non-transitory machine readable medium of claim 17, wherein the instructions cause the machine to:

identify an error message occurring within logs above a threshold;

in response to the error message corresponding to a first type of error, implement an action to address an error associated with the error message; and in response to the error message corresponding to a second type of error, remove the error message from the logs.

24. The non-transitory machine readable medium of claim 17, wherein the instructions cause the machine to:

select error messages from the logging level having a severity selected by the expression and from logging levels having severities greater than the severity of the logging level; and skip error messages from logging levels having severities less than the severity of the logging level.

25. The non-transitory machine readable medium of claim 17, wherein the instructions cause the machine to:

in response to detecting that the logs are maintained as secure logs with restricted access, identify and mask sensitive data within the secure logs.

26. The non-transitory machine readable medium of claim 17, wherein the instructions cause the machine to:

execute a quality of assurance test for the application to identify and auto-triage the troubleshooting case as a known issue.

27. The non-transitory machine readable medium of claim 17, wherein the instructions cause the machine to:

learn new error mappings identified while processing incoming troubleshooting cases.

* * * * *